United States Patent
Heitz et al.

(10) Patent No.: US 10,989,574 B2
(45) Date of Patent: Apr. 27, 2021

(54) METHOD FOR IN-SITU CALIBRATION OF AN ANALOG MEASUREMENT TRANSMISSION PATH AND CORRESPONDING APPARATUS

(71) Applicant: Endress+Hauser Wetzer GmbH+Co. KG, Nesselwang (DE)

(72) Inventors: Ulrich Heitz, Lorsch (DE); Daniel Koch, Oy-Mittelberg (DE); Marc Stahl, Wiggensbach (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 400 days.

(21) Appl. No.: 15/777,280

(22) PCT Filed: Oct. 21, 2016

(86) PCT No.: PCT/EP2016/075322
§ 371 (c)(1),
(2) Date: May 18, 2018

(87) PCT Pub. No.: WO2017/084828
PCT Pub. Date: May 26, 2017

(65) Prior Publication Data
US 2018/0328765 A1      Nov. 15, 2018

(30) Foreign Application Priority Data

Nov. 19, 2015   (DE) ..................... 10 2015 120 072.4

(51) Int. Cl.
*G01D 18/00*      (2006.01)
*G01K 15/00*      (2006.01)

(52) U.S. Cl.
CPC ......... *G01D 18/006* (2013.01); *G01K 15/005* (2013.01)

(58) Field of Classification Search
CPC .............................. G01D 18/00; G01K 15/00
See application file for complete search history.

(56) References Cited

U.S. PATENT DOCUMENTS

| | | | | |
|---|---|---|---|---|
| 4,532,601 A | * | 7/1985 | Lenderking | ............ G01K 15/00 374/E1.005 |
| 5,490,065 A | * | 2/1996 | Hoenninger | ......... G01R 31/282 701/102 |

(Continued)

FOREIGN PATENT DOCUMENTS

DE    102011107856 A1    1/2013

OTHER PUBLICATIONS

Search Report for International Patent Application No. PCT/EP2016/075322, WIPO, dated Jan. 24, 2017, 10 pp.

*Primary Examiner* — Yoshihisa Ishizuka
(74) *Attorney, Agent, or Firm* — Christopher R. Powers; Endress+Hauser (USA) Holding Inc.

(57) ABSTRACT

A method for in-situ calibration of an analog measurement transmission path coupled with the determining and/or monitoring of a process variable of a medium is disclosed, wherein analog electrical signals are transmitted via the measurement transmission path from a control/evaluation unit to a control unit, wherein the control/evaluation unit is associated with a sensor, which determines and/or monitors the process variable based on at least one component sensitive for the process variable. The sensor is operated either in a measuring mode or in a simulation mode, wherein, in the simulation mode, the control/evaluation unit outputs for a set time span an analog electrical signal, which is unequivocally recognizable as simulated and is recognized and registered by control unit, and the calibrating of the measurement transmission path is performed, in that the (Continued)

control unit determines the deviation between the analog electrical signal and the registered analog electrical signal.

12 Claims, 3 Drawing Sheets

(56) References Cited

U.S. PATENT DOCUMENTS

| | | | | |
|---|---|---|---|---|
| 2003/0158683 A1* | 8/2003 | Gauthier | ............... | G01D 3/022 |
| | | | | 702/99 |
| 2009/0216511 A1* | 8/2009 | Babel | ................. | G05B 23/0256 |
| | | | | 703/13 |
| 2011/0196658 A1* | 8/2011 | Lohmann | ............... | G01D 18/00 |
| | | | | 703/6 |
| 2012/0051389 A1* | 3/2012 | Schalles | ............... | G01K 15/002 |
| | | | | 374/1 |
| 2013/0144549 A1 | 6/2013 | Temkine et al. | | |
| 2014/0200840 A1* | 7/2014 | Cox | ....................... | G01D 18/00 |
| | | | | 702/104 |
| 2016/0043730 A1* | 2/2016 | Simon | ................. | H03M 1/0612 |
| | | | | 702/198 |

\* cited by examiner

METHOD FOR IN-SITU CALIBRATION OF AN ANALOG MEASUREMENT TRANSMISSION PATH AND CORRESPONDING APPARATUS

CROSS-REFERENCE TO RELATED APPLICATIONS

The present application is related to and claims the priority benefit of German Patent Application No. 10 2015 120 072.4, filed on Nov. 19, 2015 and International Patent Application No. PCT/EP2016/075322 filed on Oct. 21, 2016, the entire contents of which are incorporated herein by reference.

TECHNICAL FIELD

The invention relates to a method for in-situ calibration of an analog measurement transmission path coupled with the determining and/or monitoring of a process variable of a medium, wherein analog electrical signals are transmitted via the measurement transmission path from a control/evaluation unit to a control unit. The control/evaluation unit is, in such case, associated with a sensor. The sensor determines and/or monitors the process variable based on at least one component sensitive for the process variable. The process variable is, for example, the temperature, the density, the viscosity, the pressure, the fill level, the flow, the chemical composition, the temperature or analytical data, such as the pH-value, the turbidity or the conductivity of a medium. Corresponding sensors are produced and sold by the E+H group of companies in the most varied of embodiments. The medium can be, for example, a liquid or a gas. The analog electrical signals are, for example, electrical currents, voltages or capacitances.

Furthermore, the invention relates to an apparatus, whose components are embodied for performing the method.

BACKGROUND

Usually, the measured values of a sensor are provided to a user during operation via a communication infrastructure of a control unit located away from the sensor. This is accomplished, for example, by means of a wireless or a wired, digital communication infrastructure. In a large number of applications in automation technology, the measured value transmission and energy supply of the sensor occurs via a two-wire line. This is particularly of consequence in the fields of automation technology, where limitations on the energy supplied to the sensor are present, such being always the case when sensors are applied in explosion-endangered regions.

Used as electrical signals, in such case, are standardized signals. For electrical currents, there exist, in such case, according to DIN IEC 60381-1, the standardized measuring ranges, 0-20 mA and 4-20 mA. The 4-20 mA measuring range has, in such case, the advantage over the 0-20 mA measuring range that a wire monitoring is enabled, since a signal of 0 mA is a reliable indication of a disturbance. In automation technology, consequently, the 4-20 mA standard is preferred. In addition, there exist for the 4-20 mA measuring range also standards for a minimum and maximum electrical current at which an alarm is triggered. According to the NAMUR recommendation NE43, a defect alarm is triggered below a minimum electrical current of 3.8 mA and above a maximum electrical current of 20.5 mA.

The Highway Addressable Remote Transducer (HART) method is a standardized, widely distributed digital communication system, which uses the 4-20 mA standard for electrical current transmission. A digital signal is produced by modulating onto the analog signal a high-frequency oscillation of 1.2 kHz and 2.2 kHz. Such a HART interface, which enables the additional sending of digital information on an analog electrical current measurement transmission path, is not always available in practice.

In that case, only analog electrical signals can be transmitted between the sensor and the control unit. The sensor has a control/evaluation unit, which operates the at least one sensitive component of the sensor, evaluates the measured value of the at least one sensitive component, and produces an analog electrical signal representing the process variable. The analog electrical signal is then provided via the analog measurement transmission path to the control unit located external to the sensor. The control unit is, for example, arranged in a control room or is connected with a control room. The electrical signal comes, in such case, from a value range referred to as the useful range. The useful range is so selected, in such case, that it corresponds to the maximum and minimum of the process variable in the process.

The user parameterizes the measurement transmission path, in such case, such that the useful range selected for the process is a real portion of the standardized measuring range. The terminology, real portion, means that the useful range lies within the standardized measuring range. There are, however, supplementally still regions of the measuring range, which are not assumed during the process, since they lie below or above the useful range.

Since the analog measurement transmission path can experience drift during use, often a periodic re-calibrating of the analog measurement transmission path is necessary. In such case, the entire electrical circuit, which is used for sending the analog electrical signals, is checked. In the state of the art, methods are known for this, which use simulated electrical signals for calibrating. For example, the firm, Fluke Calibration, sells a device, which produces simulated analog electrical signals, in order to check and/or calibrate a measurement transmission path therewith. This re-calibrating involves a removal of the sensor and represents, consequently, a large effort.

SUMMARY

An object of the invention is to provide a method and an apparatus, which enable an in-situ calibrating of the measurement transmission path.

The object of the invention is achieved by operating the sensor either in a measuring mode or in a simulation mode. In the measuring mode, the control/evaluation unit transduces the measured values of the at least one sensitive component of the sensor into the analog electrical signal. In the simulation mode, the control/evaluation unit outputs for a set time span at least one analog electrical signal, which is unequivocally recognizable as simulated and which is recognized and registered by the control unit. In the simulation mode, a calibrating of the measurement transmission path is performed, in that the control unit determines the deviation between the analog electrical signal provided by the control/evaluation unit and the registered analog electrical signal. In a variant, in the case of a deviation, the registered analog electrical signal is then supplementally corrected in the control unit.

A fundamental concept of the invention is thus that the sensor can be operated both in the measuring mode as well as also in the simulation mode and that the analog measurement transmission path is calibrated in the simulation mode. In this way, the sensor no longer has to be uninstalled, in order to calibrate the measurement transmission path. The in-situ calibrating of the analog measurement transmission path is enabled by a suitable embodiment of the control unit and of the control/evaluation unit of the sensor. A calibrating of the measurement transmission path can thereby be implemented and displayed, in that the control/evaluation unit outputs for a defined time span at least one constant, simulated, analog electrical signal on the measurement transmission path.

An advantageous embodiment of the method of the invention provides that a plurality of simulated, constant, electrical signals are output sequentially for certain lengths of time. The constant signals differ in each time interval by a certain magnitude from the constant electrical signal in the preceding interval, for example, by a fixed positive amount. In this way, the standardized measuring range of the measurement transmission path is covered in a ramp profile. The ramp profile is, in such case, a non-continuous signal as a function of time. A variant provides that the measuring range is covered by a strongly monotonically rising signal as a function of time. The signal as a function of time can be, for example, linear or logarithmic. Other possible forms of embodiment for suitable signals as a function of time, which cover the measuring range, will be apparent to a technically skilled person in the art.

A further advantage of the invention is that, based on the simulation mode of the sensor, additional information concerning the state of the sensor is transmitted via the analog measurement transmission path, information which is obtained within the control/evaluation unit of the sensor and, in known methods, can only be transmitted via a digital communication infrastructure or by means of the HART protocol.

In an advantageous embodiment of the invention, the deviation between the analog electrical signal provided by the control/evaluation unit and the analog electrical signal registered at the control unit is stored. This enables, for example, the automatic creation of a calibration protocol for calibrating the measurement transmission path. Alternatively, the deviation is stored not in the control unit, but, instead, in a separate memory unit connected with the control unit.

In a preferred further development of the invention, the simulation mode can be displayed by the control/evaluation unit to the control unit by outputting from the control/evaluation unit a preset pattern of analog electrical signals on the measurement transmission path. The signals come, in such case, from a fixedly defined value range. The preset pattern is, in such case, defined by outputting sequences of constant currents for defined lengths of time. The control/evaluation unit of the sensor is, in such case, so embodied that it outputs the pattern in the simulation mode. The control unit is, in such case, so embodied that it detects, based on the preset pattern of analog electrical signals, that the sensor is being operated in the simulation mode.

As a rule, measurement transmission paths, which use standardized measuring ranges, also possess standardized alarm limits. If there is registered at the control unit a signal that is less than the lower standardized alarm limit, $S_{min}$, then a first alarm is triggered (low alarm). If there is registered at the control unit a signal that is greater than the upper standardized alarm limit, $S_{max}$, then a different, second alarm is triggered (high alarm). In an advantageous embodiment of the invention, the value range of the analog electrical signals, which is used for display of the simulation mode, is within the range $[S_{min}, S_{max}]$, i.e., within the alarm limits of the measurement transmission path. If 4-20 mA electrical currents and NAMUR recommendation NE43 are used, the region for display of the simulation mode in this advantageous embodiment is thus the interval between 3.8 mA and 20.5 mA.

In an additional embodiment of the invention, the value range of the analog electrical signals, which is used for display of the simulation mode, is so selected that it has no overlap with the useful range. Since the useful range is a real portion of the measuring range, the unused portion of the range $[S_{min}, S_{max}]$ can be used for display of the simulation mode. In this advantageous embodiment, thus, exactly the region for display of the simulation mode is used, which is not utilized in the measuring mode during the measuring of the process variable.

In an advantageous, further development of the method, the control/evaluation unit of the sensor executes during the measuring of the process variable a transfer into the simulation mode automatically. The prerequisite for this is that at least one sensitive component assumes a certain value. It is thus possible to specify one or more values for the process variable, in the case of which the sensor transfers into the simulation mode. A variant provides that the condition for transfer into the simulation mode is defined by a combination of measured values from a plurality of sensitive components. The one or more values, in the case of which a transfer into the simulation mode is triggered, can, in such case, be adjusted, for example, by a user based on one or more parameters.

In an advantageous embodiment of the invention, the control/evaluating unit is able, in the simulation mode, to create a 'good' message, a warning report and/or an error report concerning the state of the sensor and to transmit such via the measurement transmission path. The 'good' message is output based on a first preset pattern of analog electrical signals. The warning report is output based on a second pattern of analog electrical signals different from the first pattern. The error report is output based on a third preset pattern of analog electrical signals different from the first and second patterns. The 'good' message, warning report and/or error report are/is transmitted via the measurement transmission path. The control unit detects based on the received, preset and mutually distinguishable patterns, whether it is a 'good' message, a warning report, and/or an error report. The range for display of the good and warning reports lies, in such case, exactly within the alarm limits, i.e., within the value range $[S_{min}, S_{max}]$. The analog electrical signals for display of the error report lie outside $[S_{min}, S_{max}]$. The good and/or warning report can then be stored in the control unit or in a separate memory unit connected with the control unit.

In this advantageous embodiment, thus, in the simulation mode, qualitative information concerning the sensor in question can be transmitted from the control/evaluation unit to the control unit. The present invention permits the sending of additional information via the analog measurement transmission path, without requiring a HART interface.

Further, the at least one sensitive component of the sensor also transmits its measured value in the simulation mode of the control/evaluation unit. In the simulation mode, the control/evaluation unit no longer transmits the measured value via the measurement transmission path to the control unit. The control/evaluation unit is, however, also able to trigger an error report in the simulation mode, in case the measured variables of one or more sensitive components of the sensor exceeds and/or subceeds critical values for the process variable. These critical values are established within the control/evaluation unit. The method of the invention enables, thus, for example, simultaneously transmitting a 'good' message and, in parallel therewith, continued monitoring of the process variable, so that also in the simulation mode a warning or error report is generated in the control/evaluation unit. It is, for example, thus possible to trigger a calibrating of the measurement transmission path, in case the temperature sensitive component measures a temperature of 120° C., and simultaneously during the calibrating of the measurement transmission path to be able to monitor from the control/evaluation unit whether the temperature of 120° C. is still exceeded or has been subceeded. The continual maintaining of a monitored temperature is of great importance for hygienic requirements in the foods and/or pharmaceuticals field. The method of the present invention enables also in the simulation mode a continual monitoring of the temperature.

An error report of the sensor can only be removed by a manual interaction with the sensor and/or the measurement transmission path. In contrast therewith, a further development of the invention provides that the sensor is returned automatically to the measuring mode after output of a good and/or warning report.

The changing of the operation of the sensor in the measuring mode to operation of the sensor in the simulation mode for in-situ calibrating of the measurement transmission path, as well as the changing of the operation of the sensor in the simulation mode back to operation of the sensor in the measuring mode, can thus occur completely automatically in the present invention. The transfer into the simulation mode can be triggered by at least one sensitive component indicating a value, and the change back into the measuring mode can be triggered automatically following the good and/or warning report.

In addition thereto, another further development provides that the transfer into the simulation mode can also occur manually. For example, a voltage interruption can cause the transfer into the simulation mode and the in-situ calibrating of the measurement transmission path. Since in the case of the start-up of the sensor a voltage interruption occurs, this represents an especially advantageous, further development, since then the calibrating of the measurement transmission path is a part of the routine for start-up of the sensor. Other options for a manual intervention for the transfer into the simulation mode include the actuating of a switch located on the sensor.

Additionally, a contactless triggering is possible, i.e., a triggering actuated from the outside by a magnet, for example, using a reed relay or a Hall effect probe in the sensor. Another opportunity for a contactless triggering is provided by a short-range radio connection with the sensor, for example, in the infrared region, by Bluetooth, or by near field communication. Other such manual contactless triggerings are within the skill of the art. In such case, the sensor must be so embodied that it has a supplemental device enabled for contactless triggering.

The method of the invention provides therewith thus also that the user of the sensor can determine whether the transfer into the simulation mode occurs automatically or by a manual intervention.

Furthermore, the invention resides in an apparatus for in-situ calibration of an analog measurement transmission path coupled with the determining and/or monitoring of a process variable of a medium, wherein the apparatus is embodied for performing the method. The apparatus includes a sensor and a control unit, wherein the sensor has at least one sensitive component and a control/evaluation unit, and wherein the control/evaluation unit is connected via the measurement transmission path with the control unit.

In an especially advantageous embodiment of the apparatus, the sensor is a thermometer, wherein the sensor has a temperature sensitive component and a reference element, which experiences a phase transformation at at least one predetermined temperature point. The control/evaluation unit calibrates the temperature sensitive component at the fixed temperature point based on the reference element by determining the deviation of the first temperature sensitive component from the temperature point provided by the reference element. Such an in-situ calibrating thermometer is disclosed in DE 10 2010 040 039. In this especially advantageous embodiment of the invention, the control/evaluation unit causes a changing from the measuring mode into the simulation mode when the predetermined temperature point is passed through.

If an in-situ calibrating thermometer is operated together with an analog measurement transmission path, the measurement transmission path in long-term operation must also be calibrated in regular intervals. For calibrating the measurement transmission path, the thermometer must then be again uninstalled. The technical advantage of a self-calibrating and validating thermometer would in the case of application of an analog measurement transmission path therewith be again partially canceled. The present invention permits, thus, performing both an in-situ calibrating of the thermometer as well as also an in-situ calibrating of the analog measurement transmission path. In this advantageous embodiment of the apparatus, the present invention enables therewith completely implementing all technical advantages of the in-situ calibrating thermometer even when the digital communication infrastructure or HART interface provided therefor is not yet present.

Particularly in this especially advantageous embodiment, the simulation mode can be utilized to transmit via the analog measurement transmission path the information obtained in the calibrating of the temperature sensitive component of the sensor. In such case, in a further development, the control/evaluation unit outputs for a set time in the simulation mode a constant electrical signal, which corresponds to the deviation of the temperature sensitive component from the temperature point provided by the reference element.

The user can, in such case, for example, based on a parameter at start-up of the sensor, establish a certain constant electrical signal, with which the deviation of the temperature sensitive component from the temperature point provided by the reference element is displayed. The control unit detects, thus, based on the deviation of the constant electrical signal output by the control/evaluation unit from the fixed analog electrical signal as well as based on the parameterization of the measurement transmission path, the deviation of the temperature sensitive component from the temperature point provided by the reference element.

In an advantageous, further development of the apparatus of the invention, the deviation of the temperature sensitive component from the temperature point provided by the reference element is also stored in the control unit after transmission via the measurement transmission path. Alternatively, the deviation can also be stored in a separate memory unit connected with the control unit. This further development also enables the automatic creation of a calibration protocol for calibrating the sensor. This includes also a shared calibration protocol, which contains the calibration information for the sensor and for the measurement transmission path.

In contrast to the apparatus described in DE 10 2010 040 039, the apparatus of DE 10 2009 058 282 has a sensor with two temperature sensitive components, wherein the two temperature sensitive components are calibrated. Also in this case, the simulation mode of the sensor can be used in a manner close to that of the above described apparatus. Especially, the control/evaluation unit of the sensor can transmit a drift of the two temperature sensitive components via the analog measurement transmission path.

To the same degree, the invention can be generalized in similar manner to other sensors, which measure process variables other than temperature. If an in-situ calibrating of the sensor occurs (for example, by the use of a plurality of sensitive components) and an analog measurement transmission path is used, then the present invention can be applied mutatis mutandis also to such apparatuses.

BRIEF DESCRIPTION OF THE DRAWINGS

The invention will now be explained in greater detail based on the appended drawing, the figures of which show as follows.

DETAILED DESCRIPTION

Figure 1:
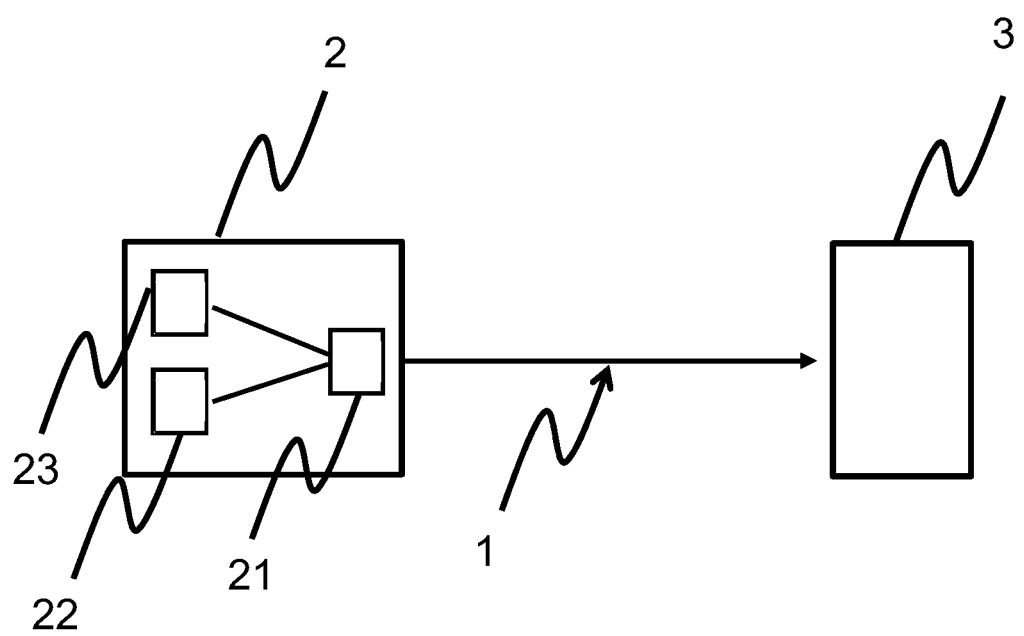
FIG. 1 shows a schematic representation of an embodiment of the apparatus of the invention.

FIG. 1 shows the schematic arrangement of the sensor 2, the measurement transmission path 1 and control unit 3, as well as the different sensor components. The sensor includes, in such case, at least one sensitive component 22 and a control/evaluation unit 21. The signal direction of the analog electrical signal is directed from the control/evaluation unit 21 via the measurement transmission path 1 to the control unit 3.

In an especially preferred embodiment, the sensitive component 22 is composed of a temperature sensor. A reference element 23 is used for calibrating the first temperature sensitive component 22. The calibrating of the sensor occurs at a fixed temperature point, at which the reference element 23 experiences a phase transition. In this example of an embodiment, the simulation mode for calibrating the measurement transmission path 1 can preferably be triggered by the fact that the fixed temperature point for calibrating the sensor 2 was passed through. Then, one after the other, both the sensor 2 as well as also the analog measurement transmission path 1 are calibrated. Then, the information established in the case of the calibrating can, in each case, for the sensor 2 and the measurement transmission path 1, be transmitted and documented in individual and/or combined, automatically produced, calibration protocols.

Figure 2:
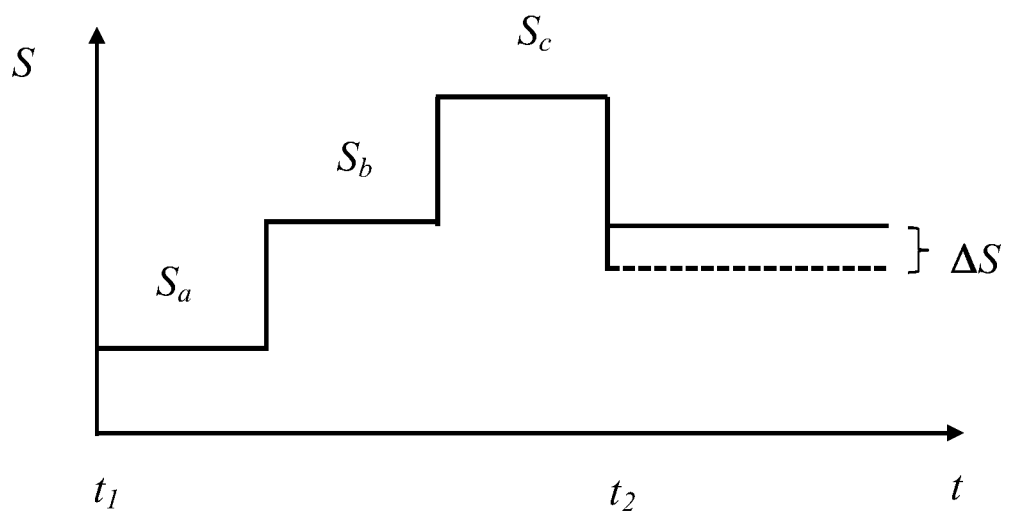
FIG. 2 shows a ramp profile, which can be used for calibrating the measurement transmission path.

FIG. 2 shows a ramp profile, such as could be used in the simulation mode for calibrating the measurement transmission path 1 in the time span between $t_1$ and $t_2$. The measuring range 5 is, in such case, defined by $S_a$ and $S_c$. The ramp profile samples the total measuring range 5. This happens in the illustrated example in that the control/evaluating unit 21 outputs, one after the other, for defined periods of time, constant signals $S_a$, $S_b$ and $S_c$, wherein $S_a$ is less than $S_b$ and $S_b$ is less than $S_c$. Since the control unit 3 is embodied such that it knows the profile output from the control/evaluating unit 21, the control unit 3 can calibrate the measurement transmission path. In a variant, all following signals are then correspondingly corrected.

If the preferred embodiment of the invention contains a temperature sensitive component 22 and a reference element 23, the control/evaluation unit 21 then additionally outputs the deviation of the first temperature sensitive component from the temperature point provided by the reference element 23. In such case, it is established, with which signal the deviation should be output (dashed line). This set signal can, in such case, be set by the user. A possibility, in such case, is to set the signal, with which the deviation is to be output, at start-up of the sensor. The user can, for example, set a parameter at a certain value. The control unit can determine the deviation $\Delta S$ and, based on the parameterization and the calibration of the measurement transmission path, then convert this into a temperature difference. The temperature difference can then be stored and/or furnished in a calibration protocol.

Figure 3:
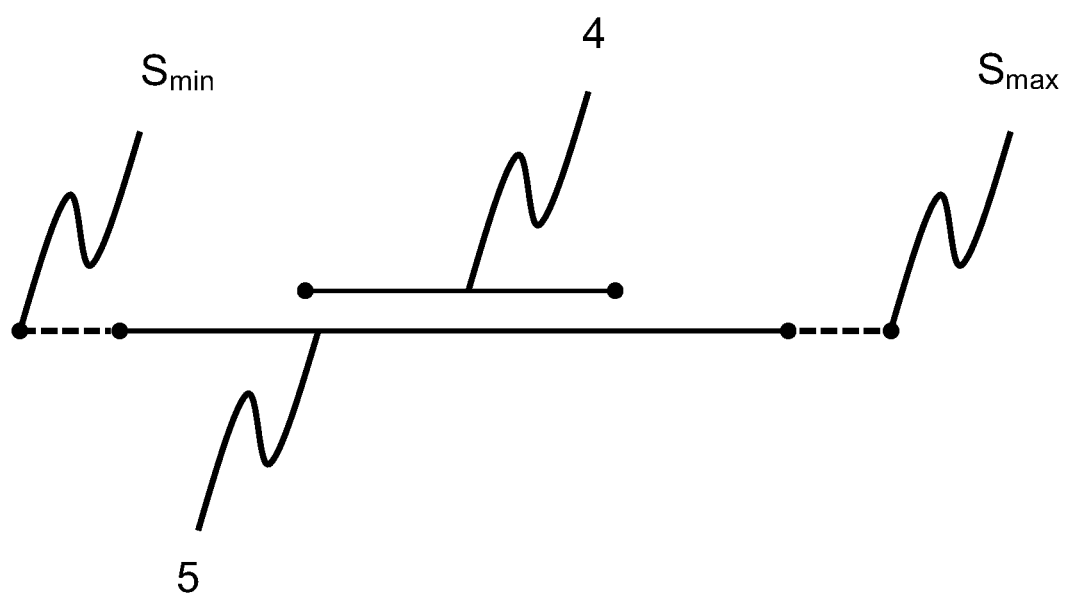
FIG. 3 shows the different signal regions of the analog electrical signal.

FIG. 3 shows the relevant signal regions of the analog electrical signal and their positions relative to one another. The measuring range 5 is, as a rule, a standardized measuring range 5. If the analog electrical signal is an electrical current, the standardized region is preferably from 4-20 mA. Outside of the measuring range 5 lie the standardized alarm limits $S_{min}$=3.8 mA and $S_{max}$=20.5 mA. The control unit 3 triggers a first alarm, when it registers an electrical current, whose value is less than 3.8 mA, and a second alarm different from the first alarm, when it registers an electrical current, whose value is greater than 20.5 mA. In an embodiment of the invention, the region between 3.8 mA and 20.5 mA can be utilized for display of the simulation mode.

The useful range 4 is contained in the measuring range. The useful range is, in such case, so selected that it corresponds to the maximum and minimum that the process variable assumes in the process. It is a real portion of the measuring range. This means that there are always unused regions in the measuring range. For example, the standardized electrical current range of 4-20 mA parameters the temperature interval from 50-180° C., while, in the application, only minimum temperatures of 80° C. and maximum temperatures of 150° C. are achieved. Therefore, there is an unused signal range contained in the measuring range. Especially, the unused signal range is a first signal range, which corresponds to temperatures between 50-80° C., and a second signal range, which corresponds to temperatures between 150-180° C. This unused signal range can be utilized in the present invention preferably for display of the simulation mode. In preferred manner, in such case, the lower barrier of the first unused (lower) signal range is expanded down to 3.8 mA, and the upper barrier of the second unused (upper) signal range is expanded up to 20.5 mA. The pattern of signals for display of the simulation mode is then preferably so selected that alternately values from the lower and the upper unused region are output from the control/evaluation unit. The idea, in such case, is to detect the simulation mode unequivocally, in that a signal sequence output by the control/evaluation unit is present in the measuring mode with disappearing probability.

The invention claimed is:

1. A method for in-situ calibration of an analog measurement transmission path coupled with the determining and/or monitoring of a process variable of a medium, the method comprising:

providing a sensor in communication with a control unit, the sensor including an evaluation unit and at least one component sensitive to a process variable, the sensor embodied to determine and/or monitor the process variable using the at least one component, wherein analog electrical signals are transmitted via a measurement transmission path from the evaluation unit to the control unit, and wherein the sensor is configured to operate in a measuring mode and in a calibration mode;

operating the sensor in the measuring mode, which includes transducing measured values of the at least one component of the sensor into an analog electrical measurement signal representing the process variable using the evaluation unit;

switching the sensor to the calibration mode, which includes:
  outputting for a set time period using the evaluation unit at least one analog electrical calibration signal that is unequivocally recognizable as simulated and is recognized and registered by the control unit; and
  calibrating the measurement transmission path, wherein the control unit determines a deviation between the analog electrical measurement signal and the registered analog electrical calibration signal;

when in the calibration mode, outputting a preset pattern of analog electrical signals from a defined value range using the evaluation unit to indicate the sensor is operating in the calibration mode; and detecting when the sensor is being operated in the calibration mode using the control unit based on the preset pattern of analog electrical signals, wherein:
  analog electrical measurement signals output in the measuring mode are from a useful range;
  the useful range is parameterized such that the useful range corresponds to a range between an anticipated minimum value and an anticipated maximum value of the process variable;
  the useful range is a real portion of the range between the minimum analog electrical signal and the maximum analog electrical signal; and
  the defined value range for indicating the sensor is operating in the calibration mode does not overlap the useful range.

2. The method of claim 1, further comprising, when in the calibration mode, storing the deviation between the analog electrical measurement signal provided by the evaluation unit and the analog electrical calibration signal registered at the control unit.

3. The method of claim 1, further comprising, when in the measuring mode:
  when the control unit registers a signal having value less than a minimum analog electrical signal, triggering a first alarm; and
  when the control unit registers a signal having value greater than a maximum analog electrical signal, triggering a second alarm different from the first alarm.

4. The method of claim 1, wherein the defined value range is within a range between a minimum analog electrical signal and a maximum analog electrical signal.

5. The method of claim 1, further comprising, when in the calibration mode, outputting a good message, a warning report and/or an error report concerning a state of the sensor, wherein:
  in the case of the good message, the evaluation unit outputs a first preset pattern of analog electrical signals;
  in the case of a warning report, the evaluation unit outputs a second preset pattern of analog electrical signals different from the first pattern;
  in the case of an error report, the evaluation unit outputs a third preset pattern of analog electrical signals different from the first pattern and second pattern;
  the analog electrical signals for outputting the good message and warning report lie in the defined value range;
  the analog electrical signals for outputting the error report lie outside the defined value range; and
  the good message and/or warning report is stored.

6. The method of claim 5, wherein the sensor is returned to the measuring mode after output of the good message and/or warning report.

7. The method of claim 1, further comprising transferring into the calibration mode when the at least one component of the sensor assumes a fixed value.

8. The method of claim 1, further comprising switching into the calibration mode in response to a manual trigger.

9. The method of claim 8, wherein the manual trigger is one of a voltage interruption of the sensor, an actuation of a magnetic switch, and a near-field communication.

10. An apparatus for in-situ calibration of an analog measurement transmission path coupled with the determining and/or monitoring of a process variable of a medium, the apparatus comprising:
  a sensor including a temperature sensitive component, a reference element, which experiences a phase transformation at at least one predetermined temperature point, and an evaluation unit; and
  a control unit, wherein the evaluation unit is in communication with the control unit via the measurement transmission path, and wherein the evaluation unit is configured:
    to operate the sensor in a measuring mode and in a calibration mode and to switch therebetween;
    when in the measuring mode, to transduce measured values of the at least one component of the sensor into an analog electrical measurement signal representing the process variable using the evaluation unit;
    when in the calibration mode, to output for a set time period using the evaluation unit at least one analog electrical calibration signal that is unequivocally recognizable as simulated and is recognized and registered by the control unit;
    when in the calibration mode, to calibrate the measurement transmission path, wherein the control unit determines a deviation between the analog electrical measurement signal and the registered analog electrical calibration signal;
    when in the calibration mode, to calibrate the temperature sensitive component at the predetermined temperature point and determine a deviation of the temperature sensitive component from the predetermined temperature point;
    to cause the sensor to switch from the measuring mode to the calibration mode when the reference element passes through the predetermined temperature point; and
    when in the calibration mode and after calibrating the temperature sensitive component and the measurement transmission path, to output for a set time period a constant analog electrical signal that corresponds to the deviation of the temperature sensitive component from the predetermined temperature point provided by the reference element,
  wherein the control unit is configured to detect the deviation of the temperature sensitive component from the predetermined temperature point based on a deviation of the constant electrical signal output by the evaluation unit from a fixed analog electrical signal and based on the parameterization of the measurement transmission path.

11. The apparatus of claim 10, wherein, when in the calibration mode, the control unit stores the deviation of the temperature sensitive component from the predetermined temperature point.

12. The apparatus of claim 10, wherein:
when the deviation of the temperature sensitive component from the predetermined temperature point subceeds a fixed lower limit value, the evaluation unit generates a good message; and
when the deviation of the temperature sensitive component from the predetermined temperature point exceeds a fixed upper limit value, the evaluation unit generates a warning report.

\* \* \* \* \*